June 24, 1941.  M. A. EDWARDS ET AL  2,247,166

DYNAMO REGULATOR SYSTEM

Filed June 24, 1939   2 Sheets-Sheet 1

Inventors:
Martin A. Edwards,
Louis W. Thompson,
by Harry E. Dunham
Their Attorney.

Patented June 24, 1941

2,247,166

UNITED STATES PATENT OFFICE 2,247,166

DYNAMO REGULATOR SYSTEM

Martin A. Edwards and Louis W. Thompson, Schenectady, N. Y., assignors to General Electric Company, a corporation of New York Application June 24, 1939, Serial No. 280,940

21 Claims. (Cl. 171—223)

This invention relates to an automatic regulator system for dynamo electric machines and more particularly to a novel and simple high-speed, high-amplification regulator system of this type.

Most dynamo electric machines are provided with an armature and a field winding and their operation is usually controlled by controlling the current in the field winding. Thus, with direct current motors the speed and current may be controlled by controlling the field current, with direct current generators the voltage and current may be controlled by controlling the field current and with alternating current machines, such as synchronous machines, the voltage, torque, and power factor may be controlled by controlling the field winding current. The field winding of such machines usually has a substantial amount of inductance so that it is difficult to change the field current rapidly enough to prevent the occurrence of dips and peaks in the value of the regulated quantity. Furthermore, most regulators employ moving parts, such as motors, solenoids, rheostats, etc. which are relatively slow acting, so that the over-all time constant of conventional regulator systems is relatively large.

In accordance with this invention, the principal element of the regulator system is an amplifier which has a very high amplification ratio and a very low time constant. For example, it can readily be made to change its output by 20,000 watts within 1/60 of a second after its input changes by one watt. It is a special direct current generator which for convenience will be referred to as an amplidyne. Its basic principle of operation is similar to the so-called Rosenberg generator in that it depends upon the cross armature reaction flux produced by current flowing between a pair of short circuited brushes for its main operating flux.

However, it differs from an ordinary Rosenberg generator in many respects. Thus, its main control winding or windings are provided with a minimum number of turns so that their inductance is a minimum and in this way the rate of response of the machine becomes very high. It is also provided with a series compensating winding for neutralizing the normal armature reaction produced by its load current. This destroys the ordinary substantially constant current characteristic of conventional Rosenberg generators but in doing so it makes the device very sensitive to changes of current in the control winding because there is no normal armature reaction tending to oppose the effect of the control winding. Another difference is that it is provided with a field winding connected to produce flux in the same direction as the cross armature reaction flux. In this manner all of the main operating flux does not have to be produced by the current flow through the short circuited brushes and consequently this short circuit current may be materially reduced, thus substantially reducing the losses of the machine and increasing the life of the short circuited brushes. This latter winding is decoupled from the armature so that the rate of change of load current in the armature of the machine will not be retarded by the inductance of this field winding.

The amplidyne may be controlled by simple control circuits having no moving parts and having substantially no time lag. These parts are relatively small and inexpensive and may be located in the base or end bell of the machine so that no separate external regulator is necessary. This control circuit ordinarily will not be required to handle more than two or three watts no matter how large the main regulated machine is.

By substantially eliminating the time lag in the moving parts of conventional regulators and by eliminating the time lag in conventional exciters by the use of the amplidyne, the speed of response of our regulator system is far in excess of that of conventional regulators and thereby a compensatory action is effected substantially simultaneously and coincidentally with the variable condition to be controlled.

The series compensating winding also produces inherently the proper regulator response when transient and unbalanced changes occur on the load circuit of the main machine. Such changes usually induce a transient current in the field circuit of the main machine and this transient current in flowing through the compensating winding of the amplidyne will automatically cause a rapid and large change in amplidyne voltage in the proper direction to secure the correct type of regulation. Further, the presence of the compensating winding insures that the amplidyne will self-excite and will be stable on inductive loads.

We have found when our regulator system is used to regulate the voltage of a main generator that the return of voltage is so rapid that it is difficult to notice the initial drop on an ordinary voltmeter. This rapid return of voltage makes lamp flicker on ordinary circuits imperceptible and permits the across-the-line starting of larger motors without production of lamp flicker.

An object of the invention is to provide a new and improved dynamo electric machine regulator system.

Another object of the invention is to provide a simple and inexpensive high speed regulator system for dynamo electric machines.

A further object of the invention is to provide a regulator system for dynamo electric machines which utilizes a cross armature reaction excited machine for controlling the excitation of the main regulated machine.

A further object of the invention is to provide a novel and simple automatic control system for regulator systems utilizing cross armature reaction excited dynamo electric machines.

The invention will be better understood from the following description taken in connection with the accompanying drawings and its scope will be pointed out in the appended claims.

In the drawings, in which the same reference characters designate the same elements throughout the several figures.

Figure 1:
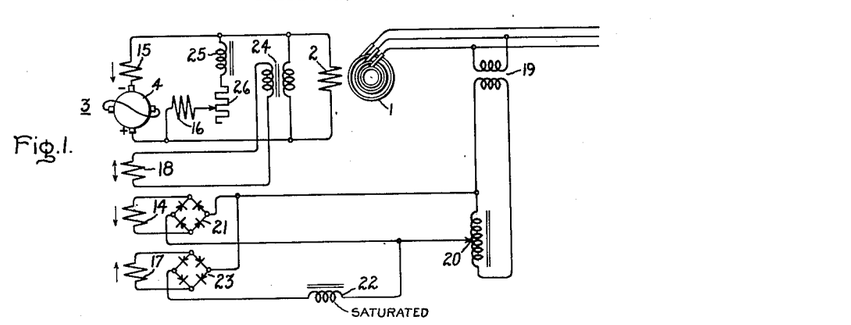
Fig. 1 is a diagrammatic illustration of an automatic alternator voltage regulator system in which the amplidyne is used as an exciter.
Figure 2:
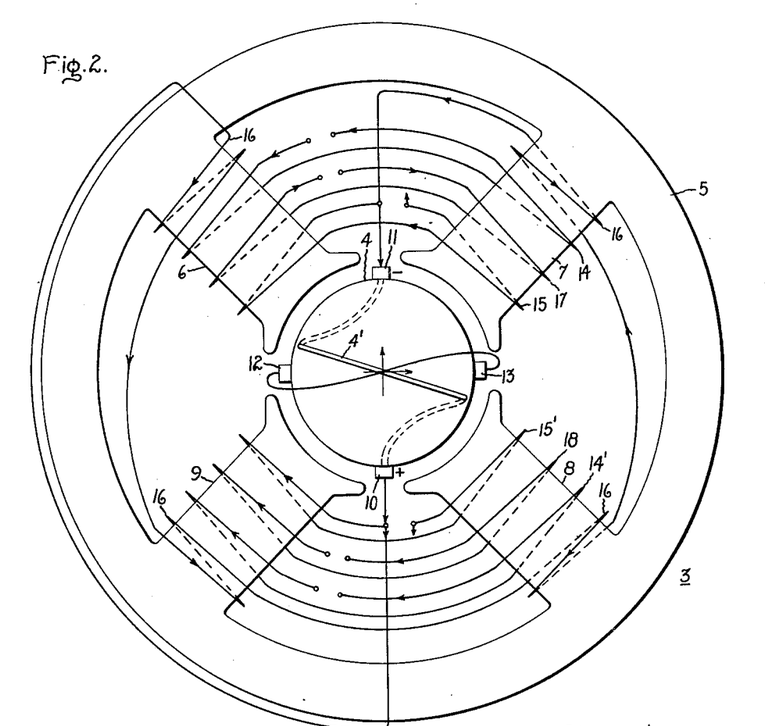
Fig. 2 shows the physical arrangement of a suitable form of amplidyne.

Referring now to the drawings and more particularly to Fig. 1, there is shown therein a main dynamo electric machine which is illustrated by way of example as a three-phase synchronous generator 1 having a main field winding 2. The current for field winding 2 is provided by an amplidyne generator or exciter 3. The physical arrangement and details of one suitable form of amplidyne are shown in Fig. 2. The form of direct current generator referred to herein as an amplidyne is described and claimed in M. A. Edwards's and and E. F. W. Alexanderson's application S. N. 281,088 filed concurrently herewith and assigned to the assignee of the present application, now Patent 2,227,992 January 7, 1941. It will be seen in the form illustrated in Fig. 2 there is provided an armature 4 which, in general, is similar to the armature of conventional direct current motors and generators. One armature coil 4' is shown. This armature is mounted in what amounts to a bipolar field structure 5 having four pole pieces 6, 7, 8 and 9. The armature is provided with a pair of 180-degree-displaced load brushes 10 and 11 and a pair of short circuited brushes 12 and 13 whose axis is at right angles to the axis of the load brushes. As shown, the brushes are so located with respect to the pole faces that a different pole face covers the armature between each different set of adjacent brushes. The armature 4 is driven by any suitable means at substantially constant speed and it may be directly driven by the alternator 1. It will be assumed that it is driven in such a direction that if poles 6 and 7 are north poles and poles 8 and 9 are south poles, load brush 10 will be the positive brush and load brush 11 will be the negative brush.

A set of positive control field windings 14 and 14' are wound on the poles 6, 7 and 8, 9 respectively. They may be wound separately around each pole piece or they may be wound around the two pole pieces together, as shown, but in either case they are adapted to make the pole pieces 6 and 7 of one polarity and the pole pieces 8 and 9 of the opposite polarity.

The operation of the amplidyne as thus far described is such that when the control windings 14—14' are energized, a voltage will be induced in the armature which will be a maximum between the short circuited brushes 12 and 13. As the resistance of the armature between brushes 12 and 13 is very low, this induced voltage will produce a heavy circulating current in the armature between the brushes 12 and 13. This heavy circulating current produces a powerful armature reaction flux in line with the brushes 12 and 13 and consequently across the axis of the load brushes 10 and 11. This cross armature reaction flux will leave the armature through pole pieces 7 and 8 and will circulate through the yoke 5 and return to the armature through the pole pieces 6 and 9. This cross flux will in turn induce a relatively high voltage in the armature between the load brushes 10 and 11. As above mentioned, if the direction of the flux through the armature which is produced by the control windings 14 and 14' is downward, the voltage induced in the armature between the load brushes will be assumed to be such to make brush 10 positive and brush 11 negative.

It has been found that the amplification ratio of this arrangement is very high, that is to say, a very small change in ampere-turns or watts applied to the control windings produces a very great change in voltage or watt output of the machine between the load brushes. Furthermore, the inductance of the control windings may be made very small by providing them with a few turns and as the armature itself has low inductance and as the cross armature reaction flux produced by the short circuit current flows in one direction through pole 6 and in the other direction through pole 7 and similarly in one direction through pole 8 and in the other direction through pole 9, the control windings 14 do not tend to retard the rate of change of this cross armature reaction flux as there is no net change in flux linkages of the control windings caused by changes in the cross armature reaction flux. Consequently, the rate of response of the voltage between the load brushes to a change in current in the control windings is very high.

Any load current flowing between the load brushes will in turn produce a normal armature reaction tending to send flux through the armature along the axis of the load brushes. This armature reaction will be in such a direction as to oppose the control winding and will thus act to limit the voltage rise produced by the machine. In order to eliminate this objectionable effect, series compensating windings 15 and 15' are provided. Winding 15 is mounted on the poles 6 and 7 and is connected in series to the negative brush 11 and winding 15' is wound on poles 8 and 9 and is connected in series with the positive brush 10. They are so wound that they produce a flux whose direction and magnitude are such as to substantially neutralize the normal armature reaction and, as will be explained later in connection with the regulator system shown in Fig. 1, they preferably overcompensate for the normal armature reaction.

It has been found that in some instances if the amplidyne operates continuously at a relatively high voltage that the relatively high short circuit current necessary to produce the cross armature reaction flux which will induce this relatively high voltage is so high as to produce relatively high losses in the machine and also to produce relatively rapid wear of the short circuited brushes 12 and 13. In order to remedy this condition there is provided a set of shunt economizer windings 16 on the pole pieces connected in such a manner across the load brushes so that pole pieces 6 and 9 have one polarity and pole pieces 7 and 8 have the opposite polarity such that the direction of flux along the axis of the short circuited brushes is in the same direction as the cross armature reaction flux. In this manner during steady state conditions the working flux can be supplied largely by the shunt windings, while rapid regulating changes in voltage can be supplied under the control of the control windings 14 by the cross armature reaction flux. By suitable means, which will be described later, the shunt winding 16 may be effectively decoupled from the armature so that its presence does not retard materially the rate of change of the cross armature reaction flux and thus does not retard the speed of response of the amplidyne.

Additional control windings 17 and 18 are provided for producing flux through the armature in the same flux axis as the flux produced by the positive control windings 14 and 14'. The function of these additional control windings will be described below in connection with the complete regulator system shown in Fig. 1.

Windings 14, 15 and 16 have been shown wound on all of the poles so as to produce a symmetrical arrangement but it will, of course, be obvious to those skilled in the art that each of the various different windings need only be wound on one pair of poles if desired. This is shown for windings 17 and 18.

Returning now to Fig. 1, the voltage of the amplidyne 3 is made responsive to the voltage of alternator 1 by connecting the positive control winding 14 across the alternator 1 through a potential transformer 19, an adjustable autotransformer 20 and a rectifier 21. Control winding 17 is connected to act as a negative or bucking control winding and is energized in parallel with the input terminals of the rectifier 21 through any suitable non-linear circuit element such as a highly saturated reactor 22 and another rectifier 23.

For preventing hunting of the system a stabilizing transformer 24 is provided, the primary winding of which is connected across the main field winding 2 and the secondary winding of which is connected to the control winding 18 which then acts as an anti-hunting winding.

For effectively decoupling the shunt winding 16 from the armature 4 of the amplidyne an impedance, which is shown by way of example as a reactor 25, is connected in series therewith. The effect of this reactor is to permit relatively rapid changes in the flux linkages of the winding 16 when the cross armature reaction flux changes, while at the same time permitting the flux linkages of the system as a whole to remain constant momentarily. In other words, the presence of the reactor 25, in effect, greatly increases the leakage reactance of the winding 16 although it of course does not alter the mutual reactance between the winding 16 and the armature 4. However, this effective increase of leakage reactance has a decided decoupling effect.

For adjusting the current setting of the shunt winding 16 a suitable series rheostat 26 is provided.

In order that the amplidyne exciter 4 will inherently build up voltage, the compensating winding 15 is made strong enough to produce a slight amount of overcompensation for the normal armature reaction.

In order to hold down the amplidyne voltage and prevent the overcompensating winding 15 from running the voltage up too high the buck or negative control winding 17 is made to predominate over the positive control winding 14 when the voltage of alternator 1 is normal and this difference between the effect of the two windings is substantially equal and opposite to the overcompensating effect of the series winding.

The operation of Fig. 1 is as follows. The proper normal voltage which it is desired to maintain is selected by adjusting the autotransformer 20 to the proper ratio. The rheostat 26 is adjusted so that the shunt winding 16 will supply substantially all of the necessary flux to cause the amplidyne 4 to produce the necessary current in the main field winding 2 to produce this desired normal voltage. If now the voltage of alternator 1 should decrease for any reason, such as because of the sudden application of load thereto, the current in the bucking control winding 17 will decrease a greater percentage than the current in the positive control winding 14 will decrease because the presence of the saturated reactor 22 causes the current in its circuit to change by a relatively greater amount compared with the change in current in the linear circuit containing the winding 14. Consequently, the resultant negative or bucking effect of the two windings 14 and 17 decreases thereby permitting the amplidyne 4 rapidly to increase its voltage and hence to increase the excitation and voltage of the main alternator. Upon an increase in voltage of the main alternator the opposite action takes place and the predominance of the bucking winding 17 over the positive winding 14 increases, thereby rapidly reducing the voltage of the amplidyne exciter and consequently reducing the voltage of the main alternator.

During steady state conditions the voltage of the main field winding 2 is constant so that no voltage is induced in the secondary winding of the stabilizing transformer 24 and consequently no current flows in the anti-hunting winding 18. However, during operation of the regulator system the voltage of the main field winding is changing and this change in voltage applied to the stabilizing transformer's primary winding induces a transient voltage in its secondary winding which causes a flow of current in the control winding 18. The winding 18 is so arranged that when the voltage of the field winding 2 is increasing the transient current in the winding 18 will produce a negative or bucking effect on the voltage of the exciter and vice versa, thereby checking the action of the regulator system and preventing it from over-shooting.

Because the series field 15 overcompensates, the regulator system will tend to have a slightly rising voltage characteristic with increases in load but if this is objectionable, as it sometimes will be during parallel operation of a plurality of main generators, suitable apparatus, such as line drop compensating means, may be employed to bias the main control in accordance with increases in load so that the regulator system as a whole will hold flat voltage or even a drooping voltage with increases in load. Such line drop or current compensating means are well known in the art.

In addition to its functions of compensating for the normal armature reaction and causing rapid self-excited voltage build up of the exciter the series field winding 15 has a number of additional important functions. Thus, it keeps up the excitation of the system during short circuit conditions on the main generator 1. During such conditions the terminal voltage of the machine drops to zero or a low value of voltage so that the control windings will not be sufficiently energized and consequently if it were not for the series field winding 15 the excitation of the system would be lost.

Still another important function of the series field 15 is that of speeding up the transient changes in the excitation. It is well known that when an inductive load is suddenly applied to the alternator, its field winding will tend to become demagnetized by armature reaction so that a transient current will flow in the field circuit to maintain constant flux linkages. This transient current, acting through the series field, increases the excitation of the amplidyne instantaneously, and brings about a very rapid increase in excitation.

The transient current induced in the main field winding is usually of higher frequency than the normal frequency of the alternator and another function of the reactor 25 is to improve the stability of the exciter by making it more difficult for this relatively high frequency transient current to flow in the shunt field winding 16.

Figure 3:
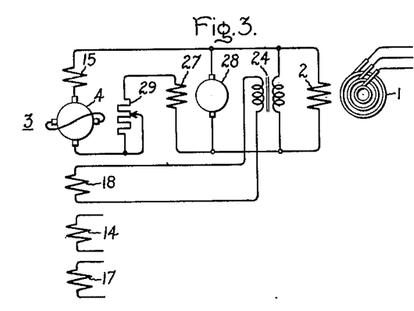
Fig. 3 is a modification in which the amplidyne is connected in series with the self-excited field of a machine so that it acts either as a counter E. M. F. machine or a boosting machine or a boosting and bucking machine depending upon the type of control which it is desired to employ.

In the modification shown in Fig. 3 the amplidyne operates as a buck and boost generator and it is connected in series with the shunt field winding 27 of a conventional exciter 28 whose terminals are connected to the field winding 2. A conventional field rheostat 29 is provided for adjusting the current in the main exciter field circuit.

The control windings 14 and 17 and the anti-hunting winding are all energized as in Fig. 1 except that at normal voltage of the main alternator the windings 14 and 17 substantially neutralize each other. If then the voltage departs from normal the winding 17 will either increase or decrease its energization faster than the winding 14, thus providing a reversible net controlling excitation for the amplidyne and causing its polarity to reverse so as to either buck or boost the voltage of the main exciter 28.

This circuit has the advantage that for steady state conditions only the difference between the generated E. M. F. and the field resistance drop needs to be supplied by the amplidyne. By adjusting the resistance 29 correctly this can be made very small. Furthermore, the main exciter will continue to supply current even if the alternator is short circuited. Consequently, the series field winding 15 need not provide any overcompensation and can be used to exactly neutralize the normal armature reaction. With this arrangement the voltage regulation characteristic will not rise under load and load current compensation is unnecessary.

Furthermore, the shunt winding 16 is no longer necessary because during steady state conditions the output of the amplidyne is relatively low and therefore this winding has been omitted.

The stabilizing transformer and the anti-hunting winding 18 function in the same manner as in Fig. 1.

While in Fig. 3 the amplidyne is used as a buck and boost generator having a reverse polarity for selectively aiding and opposing the voltage of the main exciter 28, it will, of course, be obvious to those skilled in the art that the amplidyne may also be operated at constant polarity either as a boosting generator or a bucking and counter E. M. F. generator. The only difference will be in the adjustment of the control circuit for the windings 14 and 17 so that they will produce the proper net ampere turns at the desired normal voltage of the alternator.

Figures 4, 11:
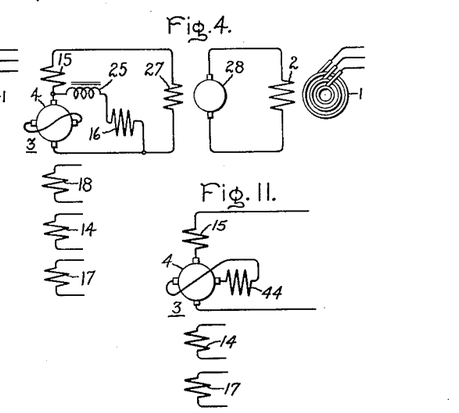
Fig. 4 is a modification in which the amplidyne is connected as a pilot exciter for exciting a separately excited main exciter.
Fig. 10 is a modification in which a direct current saturable core reactor is used as an amplifier between the main control circuit and the control winding of the amplidyne and Fig. 11 is a modified amplidyne having a series field in the short circuited axis.

In the modification shown in Fig. 4 the amplidyne is connected as a pilot exciter for supplying all the excitation for the field winding 27 of a main exciter 28 which then becomes a separately excited machine instead of a shunt excited machine. The amplidyne and its control connections will be the same as in Fig. 1 but because of the inherent time lag introduced by the main exciter 28 the speed of the regulator system shown in Fig. 4 will not be as fast as the high speed exciter system shown in Fig. 1.

An advantage of the arrangements shown in Figs. 3 and 4 is that they can be applied to standard excitation systems relatively inexpensively because of the small amount of power required by the amplidyne.

In Fig. 4 the shunt winding 16 is connected short shunt as compared with the long shunt connection shown in Fig. 1. It has been found that this sometimes produces a desirable stabilizing effect. Current taken by the shunt field circuit does not pass through the series compensating field and thus does not contribute to the compensation of the normal armature reaction.

Figures 5, 6:
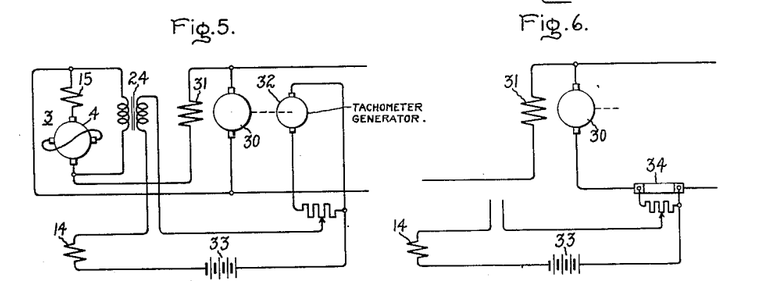
Fig. 5 is a modification showing a speed regulator system for a direct current motor.
Fig. 6 is a similar modification showing the automatic current regulation of a direct current machine.

In Fig. 5 the amplidyne is shown in an automatic speed regulator circuit for a direct current motor 30. The amplidyne is connected in series with the shunt field winding 31 of the motor and may be controlled so as to act as a counter E. M. F. generator in this field circuit. The control field winding 14 is energized by the difference between the voltage of a tachometer generator 32 and the voltage of a standard battery 33 so that at normal speed if these voltages are equal the current in the control winding will be zero and if the speed increases or decreases the difference in tachometer generator voltage with respect to the constant battery voltage will produce variable amounts of current in the winding 14 for controlling the magnitude and polarity of the voltage of the amplidyne 4 so as to maintain the speed of the motor substantially constant. The stabilizing transformer 24 is connected to respond to the voltage of the amplidyne and its secondary winding is connected in series with the control winding so that the anti-hunting impulses which are proportional to the rate of change of voltage of the amplidyne may be made to aid or oppose the controlling effect of the control winding 14.

Fig. 6 differs from Fig. 5 in that the regulated quantity is the current of machine 30. This is applied to the control winding 14 by means of a shunt 34 in the main circuit of the machine 30 so that the winding 14 responds to the difference between the voltage drop in the shunt and the voltage of the battery 33. The rest of the circuit and its operation are the same as that of Fig. 5.

Figure 7:
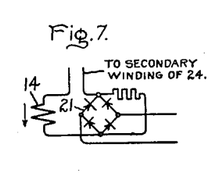
Fig. 7 is a modified anti-hunting circuit connection.

In the modification shown in Fig. 7 the secondary winding of the stabilizing transformer 24 is connected in series with the control winding 14, thus producing an anti-hunting circuit which is similar to that shown in Fig. 5 and permitting the elimination of the separate anti-hunting control winding 18. A resistor is connected in parallel with the rectifier 21 so that the transformer 24 may apply a reverse voltage to the control field 14 and not be blocked by rectifier 21.

Figure 8:
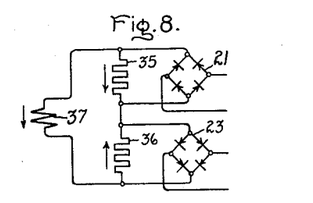
Fig. 8 is a modified control circuit connection which permits the use of a single control winding instead of a pair of differentially acting control windings on the amplidyne.

In the modification shown in Fig. 8 the linear and non-linear control circuits feeding the rectifiers 21 and 23 in Fig. 1, each have their outputs connected across separate resistors 35 and 36 so that the individual voltage drops produced in these resistors are proportional to the current outputs of the rectifiers 21 and 23 respectively. These resistors are then connected in series with a single control winding 37 for the amplidyne. In this manner, the controlling effects are combined electrically by the resistors 35 and 36 instead of magnetically by the separate control windings 14 and 17 and only one main control winding is necessary.

Figure 9:
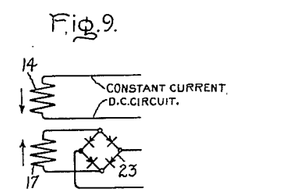
Fig. 9 is a modification in which one control winding on the amplidyne is energized by a constant current and the other control winding has its current varied in accordance with the regulated quantity.

In Fig. 9 the control winding 14 is shown as energized by any suitable constant current direct current circuit, while the winding 17 is energized from the rectifier 23 as in Fig. 1. With this arrangement the current in the winding 14 serves as the standard of comparison for the regulator and the amplidyne responds to the difference in the ampere-turns of the windings 14 and 17, as in Figs. 1, 3 and 4. Because the winding 14 is constantly energized it will always be producing a control flux in the proper direction to build up the voltage of the amplidyne 4 so that failure of voltage on the main machine, such as by short circuit, will serve to increase the voltage of the amplidyne rather than decrease it and for this reason it is unnecessary to have the series winding 15 overcompensate for the normal armature reaction and consequently the winding 15 may be proportioned to produce exact compensation.

Figure 10:
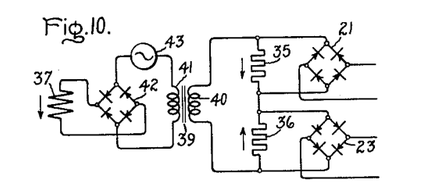

In Fig. 10 an amplifier of any suitable type, such for example as a saturable core reactor 39 is inserted between the resistors 35 and 36 of Fig. 8 and the control winding 37. As shown, this reactor has a direct current saturating winding 40 connected in series with the resistors 35 and 36 and an alternating current winding 41 connected to the input terminals of a rectifier 42 in an alternating current circuit supplied with current by any suitable source 43. The direct current output terminals of the rectifier 42 are connected to the control winding 37. In this manner a very small regulating impulse may be amplified by the reactor 39 and further amplified by the metadyne 4.

It should, of course, be understood that the modifications shown in Figs. 7, 8, 9 and 10 are not necessarily alternative and that any two or more of them may be combined in a single regulator system.

In Fig. 11 a series cross field winding 44 is used to supply the base excitation and act as an economizer winding. This winding replaces the shunt winding 16 as used in Figs. 1, 2 and 4. Winding 44 is connected in series with the short circuited brushes and produces flux along the short circuited axis of the armature.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States, is:

1. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on said pole pieces connected in series with said load brushes and arranged to send flux through said armature in such direction and of such magnitude as substantially to neutralize the armature reaction caused by a flow of current through said load brushes, a set of shunt economizer windings on said pole pieces connected in shunt circuit relationship to the circuit supplied by said load brushes and arranged to produce a flux through said armature which is in the same direction as the armature reaction flux produced by current flowing between said short circuited brushes, means for decoupling said shunt windings and said armature, a set of anti-hunting windings on said pole pieces arranged to send flux through said armature in a direction parallel to the flux produced by said control windings, and a stabilizing transformer having its primary winding connected in shunt to the field winding of said main dynamo and having its secondary winding connected to the terminals of said anti-hunting winding.

2. An automatic regulator system for a main dynamo electric machine of the type which is provided with a field winding, comprising, in combination, a cross-armature-reaction-excited direct-current exciter for energizing the field winding of said main dynamo, a series winding on said exciter for over-compensating for the normal armature-reaction of said exciter whereby said exciter tends to build up voltage like a conventional series generator, and means responsive to the value of an electrical condition associated with the operation of said main dynamo for controlling the voltage of said exciter, said means being arranged to neutralize the over-compensating effect of said series winding when the value of said condition is normal.

3. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on said pole pieces connected in series with said load brushes and arranged to send flux through said armature in such direction and of such magnitude as substantially to neutralize the armature reaction caused by a flow of current through said load brushes, and a set of shunt economizer windings on said pole pieces connected in shunt circuit relationship to the circuit supplied by said load brushes and arranged to produce a flux through said armature which is in the same direction as the armature reaction flux produced by current flowing between said short circuited brushes.

4. An automatic regulator system for a main dynamo electric machine of the type which is provided with a field winding, comprising, in combination, a cross-armature-reaction-excited direct-current exciter for energizing the field winding of said main dynamo, a series winding on said exciter for over-compensating for the normal armature reaction of said exciter whereby said exciter tends to build up voltage like a conventional series generator, and means responsive to the value of an electrical condition associated with the operation of said main dynamo for controlling the voltage of said exciter, said means comprising a pair of differentially acting control windings one of which is energized through a linear impedance-current characteristic circuit and the other of which is energized through a non-linear impedance-current characteristic circuit, said windings being so proportioned that when the value of said condition is normal the net magnetizing effect of said control windings neutralizes the over-compensating effect of said series winding.

5. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for supplying all of the current for the field winding of said main dynamo, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on said pole pieces connected in series with said load brushes and arranged to send flux through said armature in such direction and of such magnitude as substantially to neutralize the armature reaction caused by a flow of current through said load brushes, and a set of shunt economizer windings on said pole pieces connected in shunt circuit relationship to the circuit supplied by said load brushes and arranged to produce a flux through said armature which is in the same direction as the armature reaction flux produced by current flowing between said short circuited brushes.

6. An automatic regulator system for a main dynamo electric machine of the type which is provided with a field winding, comprising, in combination, a separately excited exciter for supplying current to the field winding of said main dynamo, a cross-armature-reaction-excited direct-current pilot exciter for energizing the field winding of said separately excited exciter, a series winding on said pilot exciter for substantially exactly neutralizing the normal armature reaction of said pilot exciter, and means responsive to the value of an electrical condition associated with the operation of said main dynamo for controlling the voltage of said pilot exciter.

7. An automatic regulator system for a main dynamo electric machine of the type which is provided with a field winding and a shunt connected exciter for energizing said field winding, comprising, in combination, a direct current buck and boost generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, said load brushes being connected in series with the shunt field winding of said exciter, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current in such a manner that the polarity of the voltage induced between said short circuited brushes reverses when said electrical quantity varies from one side of a predetermined value to the other side thereof, and a set of compensating windings on said pole pieces connected in series with said load brushes and arranged to send flux through said armature in such direction and of such magnitude as substantially to neutralize the armature reaction caused by a flow of current through said load brushes.

8. An automatic regulator system for a main dynamo electric machine of the type which is provided with a field winding, comprising, in combination, a shunt connected exciter for said field winding, a cross-armature-reaction-excited direct-current buck and boost generator connected in series with the shunt winding of said exciter, a series winding on said buck and boost generator for substantially neutralizing the normal armature reaction of said exciter, and means responsive to the value of an electrical condition associated with the operation of said main dynamo for controlling the voltage of said buck and boost generator.

9. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on said pole pieces connected in series with said load brushes and arranged to send flux through said armature in such direction and of such magnitude as substantially to neutralize the armature reaction caused by a flow of current through said load brushes, a set of shunt economizer windings on said pole pieces connected in shunt circuit relationship to the circuit supplied by said load brushes and arranged to produce a flux through said armature which is in the same direction as the armature reaction flux produced by current flowing between said short circuited brushes, and means comprising a reactor connected in series with said economizer windings for effectively decoupling said windings from said armature.

10. An automatic regulator system for a main dynamo electric machine of the type which is provided with a field winding, comprising, in combination, a cross-armature-reaction-excited direct-current exciter for energizing the field winding of said main dynamo, a series winding on said exciter for over-compensating for the normal armature reaction of said exciter whereby said exciter tends to build up voltage like a conventional series generator, and a shunt winding on said exciter for supplying substantially all of the operating flux of said exciter during steady state conditions of operation.

11. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, two sets of differentially acting control windings on said pole pieces arranged to send flux through said armature in such a direction as to induce a voltage between said short circuited brushes, linear impedance-current characteristic means responsive to variations in the value of an electrical quantity associated with the operation of said dynamo for energizing one of said sets of control windings with direct current, and non-linear impedance-current characteristic means responsive to variations in the value of said electrical quantity for energizing the other set of control windings with direct current of such polarity that the magnetizing effects of said sets of control windings oppose each other.

12. An automatic regulator system for a main dynamo electric machine of the type which is provided with a field winding, comprising, in combination, a cross-armature-reaction-excited direct-current exciter for energizing the field winding of said main dynamo, a series winding on said exciter for over-compensating for the normal armature reaction of said exciter whereby said exciter tends to build up voltage like a conventional series generator, means responsive to the value of an electrical condition associated with the operation of said main dynamo for controlling the voltage of said exciter, said means being arranged to neutralize the over-compensating effect of said series winding when the value of said condition is normal, and anti-hunting means for opposing changes in the voltage of said exciter.

13. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, a set of control windings on all of said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on all of said pole pieces connected in series with said load brushes and arranged to send flux through said armature in such direction and of such magnitude as substantially to neutralize the armature reaction caused by a flow of current through said load brushes, and a set of shunt economizer windings on all of said pole pieces connected in shunt circuit relationship to the circuit supplied by said load brushes and arranged to produce a flux through said armature which is in the same direction as the armature reaction flux produced by current flowing between said short circuited brushes.

14. An automatic regulator system for a main dynamo electric machine of the type which is provided with a field winding, comprising, in combination, a shunt connected exciter for said field winding, a cross-armature-reaction-excited direct-current buck and boost generator connected in series with the shunt winding of said exciter, a series winding on said buck and boost generator for substantially neutralizing the normal armature reaction of said exciter, means responsive to the value of an electrical condition associated with the operation of said main dynamo for controlling the voltage of said buck and boost generator, and anti-hunting means for opposing changes in the voltage of said buck and boost generator.

15. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, two sets of control windings on said pole pieces arranged to send flux through said armature in such a direction as to induce a voltage between said short circuited brushes, means including a rectifier for energizing one of said control windings in accordance with the voltage of said main dynamo, and means including a rectifier and a saturable core reactor connected in series with the input terminals of said rectifier for energizing the other set of control windings in accordance with the voltage of said dynamo.

16. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on said pole pieces connected in series with said load brushes and arranged to send flux through said armature in such direction and of such magnitude as substantially to neutralize the armature reaction caused by a flow of current through said load brushes, a set of shunt economizer windings on said pole pieces connected in shunt circuit relationship to the circuit supplied by said load brushes and arranged to produce a flux through said armature which is in the same direction as the armature reaction flux produced by current flowing between said short circuited brushes, and a stabilizing transformer having its primary winding connected in shunt to the field winding of said main dynamo and having its secondary winding connected to modify the resultant effect produced by said control windings.

17. An automatic regulator system for a main dynamo electric machine of the type which is provided with a field winding, comprising, in combination, a direct current generator having an armature provided with a pair of short circuited brushes displaced 180 electrical degrees from each other and being further provided with a pair of similarly displaced load brushes whose axis is displaced 90 electrical degrees from the axis of said short circuited brushes, said generator having a field structure provided with four pole pieces whose pole faces are located respectively between different sets of adjacent brushes whereby a different brush is between each pair of adjacent pole faces, a circuit containing said load brushes for controlling the current in the field winding of said main dynamo, a set of control windings on said pole pieces arranged to send flux through said armature in such a direction as to induce a voltage between said short circuited brushes, means responsive to variations in the value of an electrical quantity associated with the operation of said dynamo for energizing said control windings with direct current, a set of compensating windings on said pole pieces connected in series with said load brushes and arranged to send flux through said armature in such direction and of such magnitude as substantially to neutralize the armature reaction caused by a flow of current through said load brushes, and a set of series economizer windings on said pole pieces connected in series with the short circuited brushes and arranged to produce a flux through said armature which is in the same direction as the armature reaction flux produced by current flowing between said short circuited brushes.

18. An automatic regulator system for a main dynamo electric machine of the type which is provided with a field winding, comprising, in combination, a cross-armature-reaction-excited direct-current exciter for energizing the field winding of said main dynamo, a series winding on said exciter for over-compensating for the normal armature reaction of said exciter whereby said exciter tends to build up voltage like a conventional series generator, and a winding on said exciter energized by the cross-armature current thereof for supplying substantially all of the cross-armature flux of said exciter during steady state conditions of operation.

19. An automatic regulator system for a main dynamo electric machine of the type which is provided with a field winding, comprising, in combination, a cross-armature-reaction-excited direct-current generator for controlling the current in the field winding of said main dynamo, a controlling winding on said excitation controlling generator connected to be energized in accordance with an electrical condition of said main dynamo electric machine, and an additional winding on said excitation controlling generator connected to be energized by the cross-armature current of said excitation controlling generator and arranged to produce flux through the armature thereof in the direction of the cross-armature reaction.

20. An automatic regulator system for a synchronous alternating current dynamo-electric machine having a load circuit and a direct current field winding which supplies all its excitation comprising, in combination, means for substantially simultaneously and coincidently varying the voltage of said field winding with variations in the voltage of said alternating current dynamo-electric machine comprising a cross-armature-reaction excited direct current generator connected to said field winding, and means connected to be responsive to the voltage of said load circuit and providing a component of voltage varying in greater percentage relative to any change in the voltage of said load circuit for controlling the cross-armature-reaction flux of said generator substantially simultaneously and coincidently with variations in said load circuit voltage.

21. In combination, a synchronous dynamo-electric machine having a load circuit and a direct current field winding, a cross-armature-reaction excited direct current generator connected to energize said field winding and being provided with a control winding to vary its cross-armature-reaction flux, means responsive to an electrical characteristic of said synchronous machine for varying the energization of said control winding substantially simultaneously and coincidently with variations in said electrical characteristic, and a series winding on said generator arranged substantially to balance the direct-axis armature reaction flux of said generator and operating conjointly with said control winding for changing the voltage of said direct current field winding substantially simultaneously and coincidently with the current transient of said field winding occasioned by sudden current changes or unbalanced conditions in the load circuit of said synchronous machine.

MARTIN A. EDWARDS.
LOUIS W. THOMPSON.